Nov. 20, 1934.  E. VOLLENWEIDER  1,981,255
MOTION PICTURE PROJECTOR
Filed Feb. 8, 1933  3 Sheets-Sheet 1

INVENTOR
Emil Vollenweider
BY
ATTORNEY

Nov. 20, 1934.  E. VOLLENWEIDER  1,981,255
MOTION PICTURE PROJECTOR
Filed Feb. 8, 1933  3 Sheets-Sheet 2
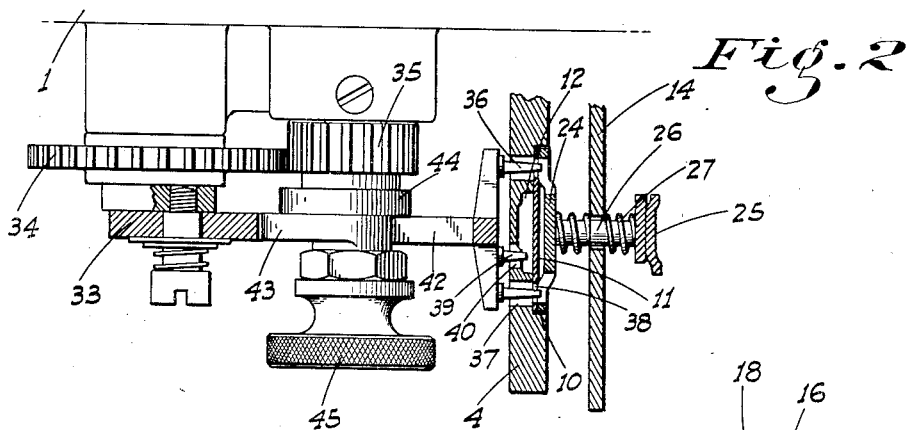
Fig. 2
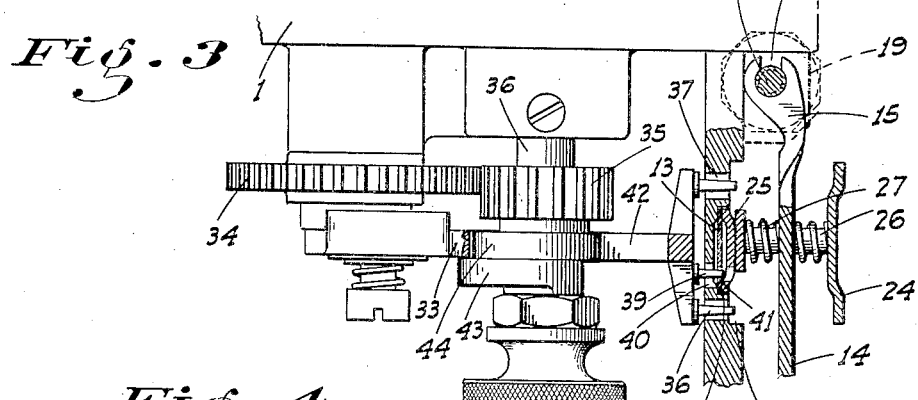
Fig. 3
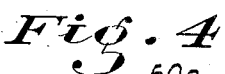
Fig. 4
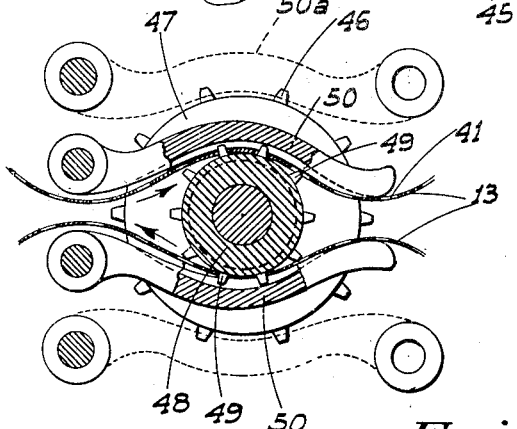
Fig. 5
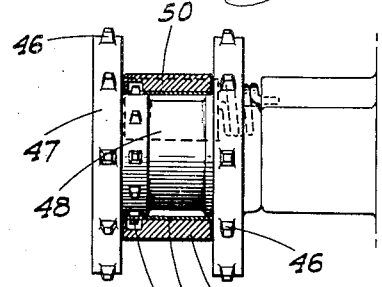
INVENTOR
*Emil Vollenweider*
BY
ATTORNEY

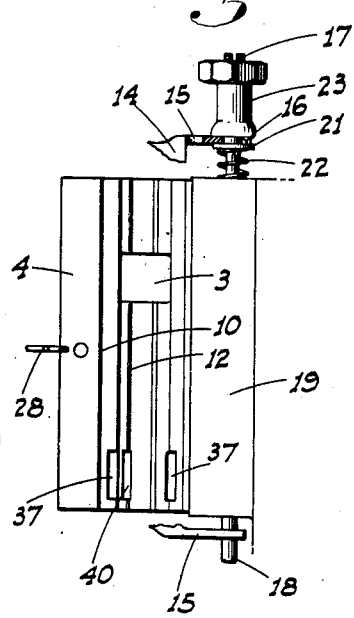
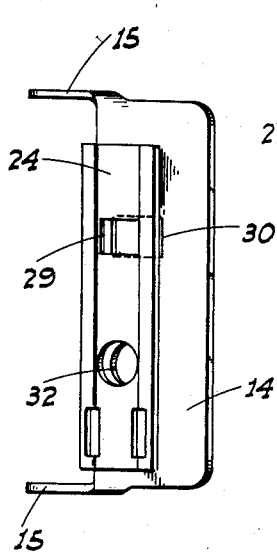
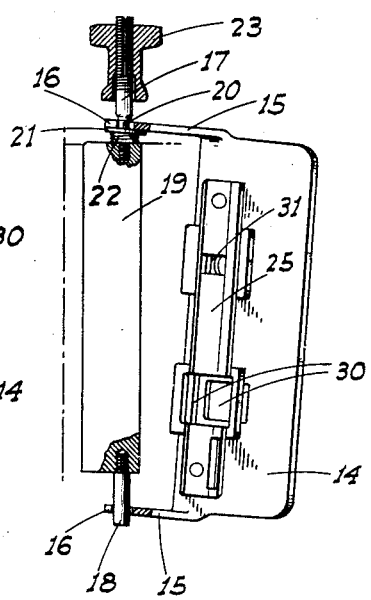
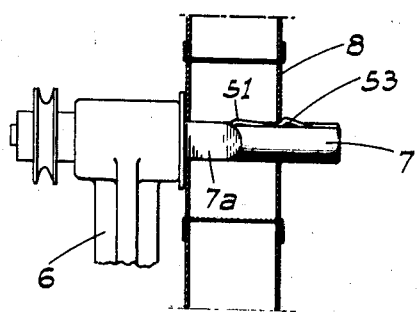
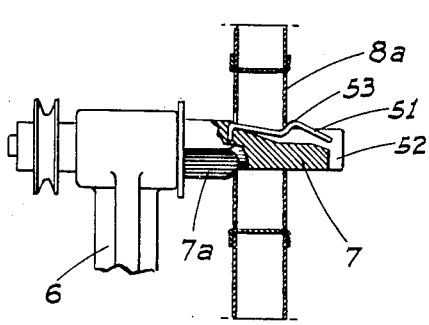

Patented Nov. 20, 1934

1,981,255

UNITED STATES PATENT OFFICE 1,981,255

MOTION PICTURE PROJECTOR

Emil Vollenweider, Sacramento, Calif.

Application February 8, 1933, Serial No. 655,728

6 Claims. (Cl. 88—17)

This invention relates to motion picture projectors, and particularly to one of that type designed for home or amateur use as distinguished from the theatrical or professional type.

The amateur motion picture camera is now put out in two sizes to use two different widths of film—the 8 and 16 mm. In the narrow film the picture is of course smaller than in the wider 16 mm. one and the linear movement of the film with each intermittent stroke of the operating mechanism of either the camera or the projector is of course correspondingly less.

Up to this time these differences have necessitated the use of separate projectors for handling the two sizes of film, and inasmuch as even these small projectors are quite costly, the possession of two such machines is beyond the purse of the average amateur.

The principal object of my invention is to avoid the necessity of this double expense by providing a projector so arranged that with a few simple and easily made adjustments, a film of either width can be run through the projector with equally effective results for both sizes or widths of film.

A further object is to devise a structure for the purpose of such a nature that it can be incorporated in a standard projecting machine with but few changes being necessary and which is of such a simple character that the cost of a projector having this double range of usefulness need be but little more than one of the ordinary single use type.

These objects I accomplish by means of such structure and relative arrangement of parts as will fully appear by a perusal of the following specification and claims.

In the drawings similar characters of reference indicate corresponding parts in the several views:

Fig. 2 is an enlarged fragmentary sectional plan on the line 2—2 of Fig. 1, showing the advancing mechanism set to operate on the wide film.

Fig. 3 is a similar view showing the mechanism adjusted to operate on the narrow film.

Fig. 4 is a sectional elevation of the film feeding spool as engaged with the narrow film.

Fig. 5 is an end view of the same.

Fig. 6 is a front elevation of the film gate.

Fig. 7 is a perspective view of the presser plate unit detached and looking at the wide film side.

Fig. 8 is a similar view of the unit looking at the narrow film side and showing the unit as being mounted in position relative to the gate.

Fig. 9 is an enlarged side elevation of a reel supporting spindle showing a wide film reel thereon.

Fig. 10 is a similar view partly in section showing a narrow film reel thereon.

Figure 1:
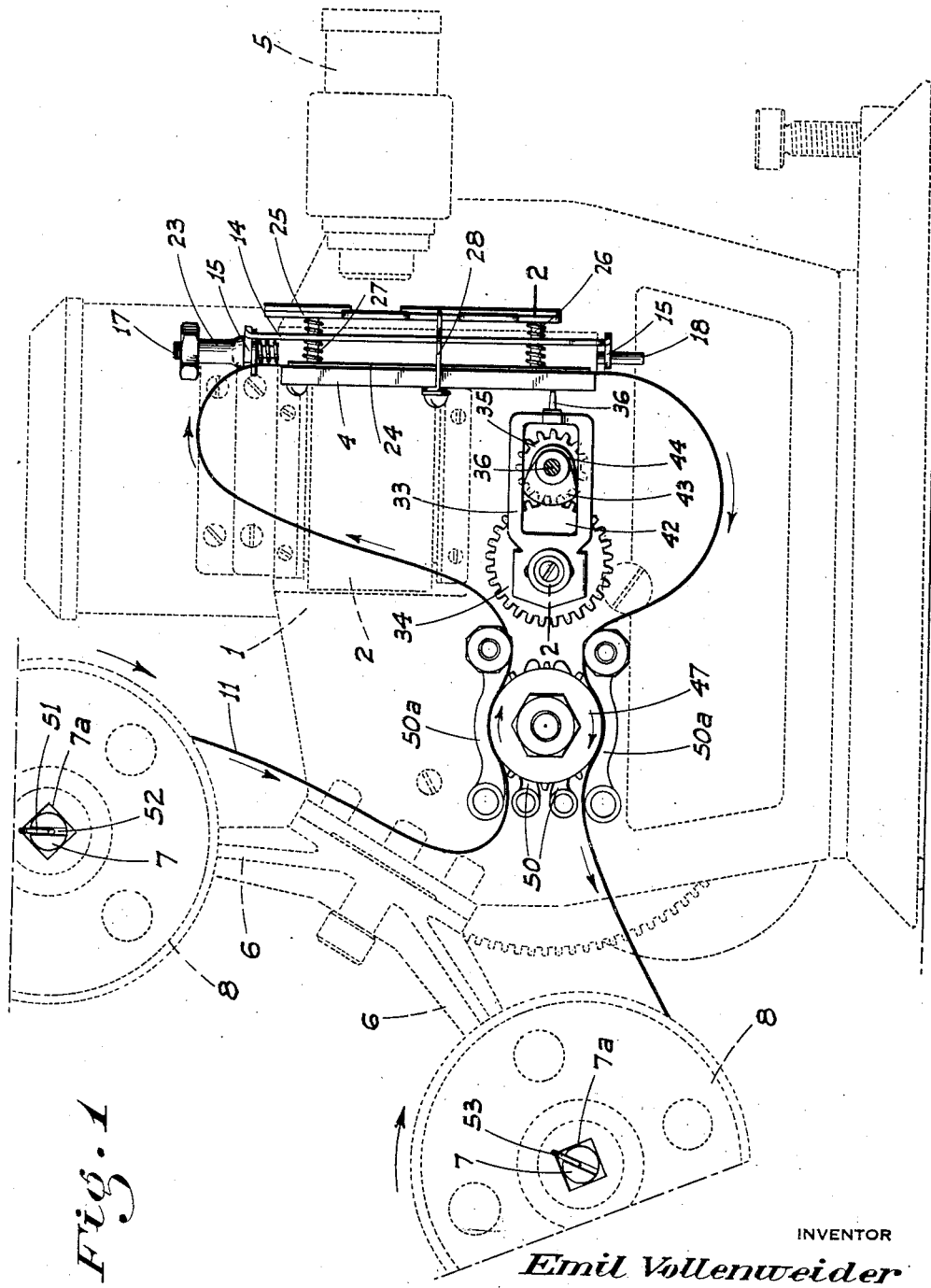
Fig. 1 is a fragmentary side outline of a motion picture projector of the portable amateur type showing the mechanism for feeding either the wide or narrow film, and operating on the wide film.

Referring now more particularly to the characters of reference on the drawings, the projector itself, which is of a standard type, includes a body or casing 1 containing the source of light which is reflected against a mirror enclosed in an angular housing 2 on one side of the casing and thrown through an opening 3 in a vertical fixed gate 4 abutting against and depending below the housing. A suitable removable lens 5 is mounted in axial alinement with the opening a certain distance in front of the gate. Arms 6 on the machine behind the gate support the spindles 7 on which the supply and take up reels 8 of the film are mounted.

The film is fed from the supply reel over the feed spool of the projector, and over and down the front face of the gate where it is engaged by the presser plate and where it is acted on by the prongs or claws of the advancing shuttle. The film then passes back under the feed spool to the take up reel. This is the standard film threading arrangement which is not disturbed in any way any more than I change the way in which the film is fed from the reel or intermittently advanced past the gate opening, over what is at present done.

What I have accomplished is to provide for the proper mounting and positioning of either the wide or the narrow film reels on the spindles; the feeding of the film at the proper speed and corresponding to the size of the pictures thereon without altering the speed of operation of the machine as a whole; the holding of the film in yieldable contact with the gate; and the proper framing of the picture irrespective of its size and the intermittent advancing of the film by the shuttle in amounts proportionate to the size of the pictures. To this end the spindles, the gate, the presser plate unit, the shuttle mechanism,, and the feed spool are made special as to certain features, so that a projector equipped with these special elements can be used for either wide or narrow films and may be adjusted or set for such use selectively and without the aid of any tools.

The front face of the gate 4 is provided with a relatively shallow and wide groove 10 extending from top to bottom of the gate and substantially the same width as and forming a track for the wide film 11. Said gate also has a narrow groove 12 in the bottom of the groove 10 and in such relation thereto as to center the picture track of the narrow film 13, the latter having slots or perforations along one side only. The opening 3 is disposed toward the upper end of the groove and gate and is the same width as the groove 12, as shown in Fig. 6. The presser plate unit co-operating with the gate comprises a supporting plate 14 having arms 15 projecting horizontally from one edge of the same at top and bottom. These arms are provided at their ends with slots 16 having restricted mouths. The widest portions of the slots are adapted to slidably and turnably engage vertically alined trunnions 17 and 18 mounted in and projecting from the top and bottom respectively of a bar 19 which projects from the casing 1 at the front side of the gate as shown in Figs. 3 and 6. The trunnion 17 a certain distance below its upper end and above the bar 19 is of smaller diameter than the remainder as shown at 20 so as to be capable of passing through the mouth of either slot 16, the distance from the top of this reduced portion to the bottom of the pin 18 being greater than the distance between the arms 15. A washer 21 is slidable on the trunnion 17, with a compression spring 22 thereunder forcing the same upwardly and toward an adjustable finger nut 23 on said trunnion. The purpose of this arrangement will be seen later.

Located on one side of the plate 14 is a concave presser plate 24 to engage the groove 10, while on the opposite side is a similar but narrow presser plate 25 to engage the groove 12. Vertically spaced pins 26 connect the presser plates in rigid and spaced relation and are slidably supported in the intermediate plate 14. Compression springs 27 about said pins between the plate 14 and the plates 24 and 25 hold the latter in yieldable floating relation to the supporting plate. A spring catch element 28 on the outer edge of the gate 4 engages the plate 14 when the latter is swung toward the gate to hold the same against opening movement and parallel to the gate; either the plate 24 or the plate 25 being then yieldably engaged with the corresponding gate groove.

The plate 24 has a picture frame opening 29 to register with the opening 3 and of a size corresponding to that of the picture on the film 11. The plates 14 and 25 have similar openings 30 alined with the opening 29 so as not to interfere with the passage of light therethrough. The plate 25 also has a picture frame opening 31 in position to register with the opening 3 when the presser plate unit is inverted, the size of the opening 31 corresponding to that of the pictures on the small film 13. The plates 14 and 24 also have openings 32 alined with the opening 31.

In operation to mount the presser plate unit for use with the narrow film for instance the unit is withdrawn from the supporting trunnions and turned so that the plate 25 faces the gate 4, and with the opening 31 toward the top. The unit is first tipped and manipulated so that the lower arm 15 slips over the lower end of the trunnion 18. The unit is then raised and the upper arm is engaged with the upper surface of the washer 21 and then pulled down so as to depress the washer and expose the reduced portion 20 of the trunnion to permit the adjacent arm slot 16 to engage said trunnion. This manipulation is shown in Fig. 8.

When the unit is thus engaged and released the spring 22 acts to force the adjacent arm 15 up against the nut 23, thus preventing the unit from being moved without interfering with its swinging movement. In this position the frame opening 31 registers with the gate opening 3. If it is necessary for the frame opening to be adjusted vertically, so as to better center the picture therein, this can be done by manipulating the nut 23. This either causes the spring 22 to raise the unit, or the nut 23 to lower the same by pressing down on the adjacent arm 15, and of course correspondingly altering the vertical positioning of the frame opening 31 or 29. The unit is removed from the supports by manipulation in the reverse order and if the other presser plate is to be used the unit is simply inverted to present the corresponding presser plate in facing relation to the gate. The arms 15 and the slots therein are duplicates of each other so that the mounting and dismounting operations are the same.

The film of either size as engaged by the gate is initially advanced by the usual shuttle arrangement. For its double purpose, that is to move both sizes of films the necessary and different amounts with each stroke the shuttle is constructed as follows:

The shuttle frame 33 is mounted at one end for eccentric movement as usual in connection with a gear 34 meshing with a pinion 35 on the motor driven shutter supporting shaft 36 of the projector, the shaft 36 being disposed between the axis of the gear 34 and the gate 4. The shuttle projects toward the gate, and at its gate end is provided with transversely spaced prongs or claws 36 to project through vertical slots 37 in the gate and engage the side slots 38 of the film 11 disposed in the groove 10. The shuttle also has another single claw 39 positioned between the claws 36 to project through the vertical slot 40 in the gate to engage the single row of slots 41 cut in the narrow film 13 down one side when said film is seated in the groove 12. The claw 39 is shorter than the claws 36 so that it will not project above the bottom of the groove 10 and thus come in contact with the wide film if the latter is mounted in the machine.

The usual opening 42 in the shuttle frame is selectively engaged by cams 43 and 44 mounted in close relation in fixed connection with the pinion 35 and the shaft 36. The cam 43 when engaged with the shuttle opening is designed to impart a vertical stroke to the shuttle of necessary length for proper movement of the wide film 11. On the other hand the cam 44 is designed to impart a shorter stroke to the shuttle as is necessary when advancing the narrow film. The outer end of the shaft 36 is provided with a pull knob 45 by means of which the shaft 36 may be moved axially so as to shift either cam into engagement with the shuttle selectively. The pinion 35 is of course of sufficient width so that it will remain engaged with the gear 34 regardless of the position to which said shaft and pinion may be shifted.

The slots of the wide film 11 between the gate and the reels engage teeth 46 disposed about the periphery of a driven spool 47 at the top and bottom of the same in the usual manner, so that the film is fed and taken up at a speed proportionate to its intermittent movement at the gate. Between its sides the spool is formed with a deep groove of sufficient width to receive the narrow film and forming a relatively small hub portion 48 on which the narrow film rides.

Said portion 48 adjacent one side has teeth 49 to engage the slots 41 of the film 13. The diameter of the portion 48 relative to that of the main large portion of the spool is such that for each rotation of said spool, the wide film will be advanced the same number of pictures as the narrow film. In other words, the steady feeding of either film by means of the spool corresponds in its extent to the intermittent advancing of the same by means of the shuttle mechanism. The narrow film is held engaged with the top and bottom teeth 49 by arms 50. These are swively mounted beyond the back end of the spool and are of substantially the same form as the standard arms 50a which engage and hold the wide film in engagement with the outer teeth 46.

The feed and take up reels of the film are mounted as usual on the spindles 7 which are turnable in and project from the arms 6. These are made special for my purpose and so as to accommodate the square holes of the reels 8 of the wide film and the round holes of the reels 8a of the narrow film. Each spindle has a square portion 7a at its end nearest the arm 6 over which the square hole of a reel 8 may pass in non-turning relation. A longitudinally extending depressible spring 51 mounted in a slot 52 in the spindle has a nub 53 projecting outwardly of the periphery of said spindle to engage the outer face of the reel 8 and prevent outward movement of the same, as shown in Fig. 9.

The square portion 7a forms a shoulder and stop for the movement of the narrow reel 8a along the spindle, and holds said reel away from the arm in its proper position, as shown in Fig. 10, or so that the film is transversely alined with the feed spool and the gate groove 12. The nub 53 of the spring holds the reel 8a against outward movement. A projecting portion of said spring also projects into one of the radial slits which are cut outwardly from the central hole of the reel as usual so that said reel is maintained in driving relation with the spindle.

When using the narrow film, the condenser lens is preferably changed, one being inserted which will give a more concentrated light beam for the narrow film.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a motion picture projector for selective use with films of different widths, the combination of a gate having a groove down its front face forming a track for one film, and another narrower groove in the bottom of the first groove and forming a track for a relatively narrow film, and a presser plate unit comprising a supporting plate, presser plates for engagement with the corresponding track grooves yieldably mounted in connection with the supporting plate on opposite sides thereof, and means for invertibly mounting the supporting plate on the machine so as to bring either presser plate into facing relation with the gate selectively.

2. A structure as in claim 1, with means incorporated with said mounting means for adjusting the unit vertically.

3. In a motion picture projector for selective use with films of different widths, a fixed gate having a groove down its front face forming a track for one film and another narrower groove in the bottom of said first groove and forming a track for a narrow film, presser plates for selective cooperation with said grooves, a supporting plate between said presser plates invertibly mounted on the machine, pins slidable through the supporting plate and rigidly connecting the presser plates, and balanced compression springs on said pins between the supporting plate and the presser plates.

4. In a motion picture projector for selective use with films of different widths, a fixed gate having a groove down its front face forming a track for one film and another narrower groove in the bottom of said first groove and forming a track for a narrow film, presser plates for selective cooperation with said grooves, a supporting plate between said presser plates, means mounting said presser plates on the supporting plate in yieldable relation thereto, vertical coaxial trunnions fixed on the machine in front of the gate and to one side of the track grooves, and forked elements projecting from the top and bottom of the supporting frame to slidably and invertibly engage said trunnions.

5. In a motion picture projector for selective use with films of different widths, a fixed gate having a groove down its front face forming a track for one film and another narrower groove in the bottom of said first groove and forming a track for a narrow film, presser plates for selective cooperation with said grooves, a supporting plate between said presser plates, means mounting said presser plates on the supporting plate in yieldable relation thereto, vertical coaxial trunnions fixed on the machine in front of the gate and to one side of the track grooves, and forked elements projecting from the top and bottom of the supporting frame to invertibly and turnably engage said trunnions, and a clamping screw threaded on one trunnion to engage the adjacent element and hold the same against turning and withdrawal.

6. A device as in claim 5, with a compression spring on said threaded trunnion under the adjacent element and on which the same rests, whereby pressing advancement of the screw against said element will affect the horizontal level of the element and the supporting plate.

EMIL VOLLENWEIDER.